July 27, 1937.  L. R. ADAMS  2,088,358
BOLT ANCHOR
Filed Feb. 10, 1936
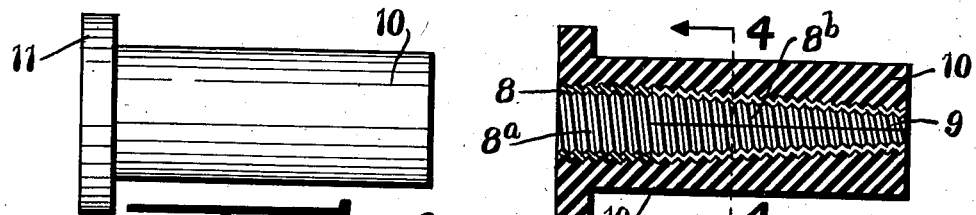
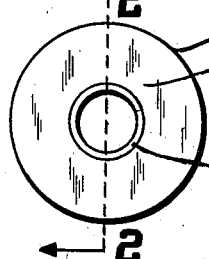 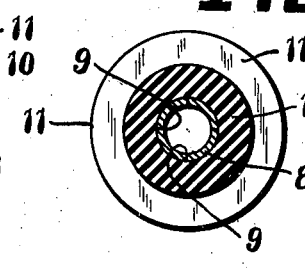 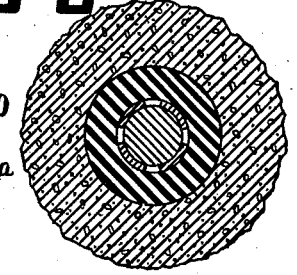
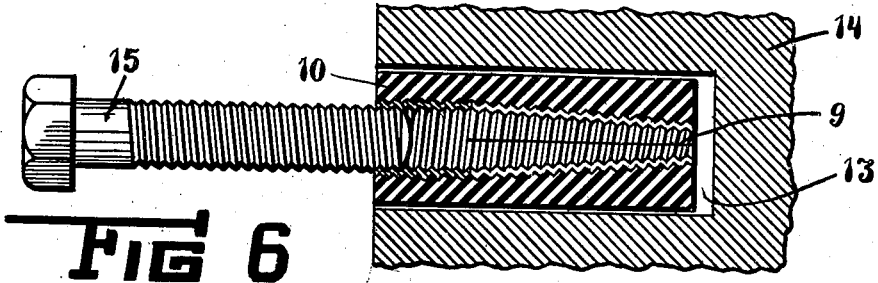
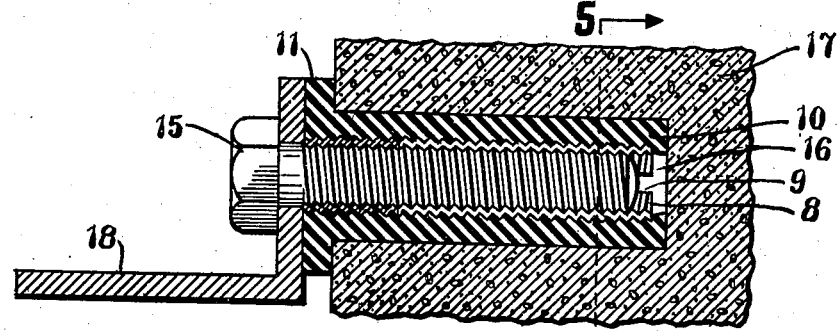
LELAND R ADAMS
INVENTOR
BY *F. E. Shannon*
ATTORNEY Patented July 27, 1937

2,088,358

UNITED STATES PATENT OFFICE 2,088,358

BOLT ANCHOR

Leland R. Adams, Akron, Ohio

Application February 10, 1936, Serial No. 63,075

7 Claims. (Cl. 85—2.4)

This invention relates to improvements in anchoring devices and while intended for use generally wherever it may be advantageously employed, the invention is particularly adapted for use as an expansible bolt anchoring device in which connection it will be illustrated in the drawing and hereinafter specifically described.

Objects of the invention are to provide an anchoring device of simple, durable construction which can be economically manufactured and which will provide efficient means for securing a bolt, screw or other fastening device in a bore or seat.

Other objects are to provide an anchoring device which may be advantageously employed in securing a bracket or other device to a supporting structure and which will interpose a cushion between the device and a supporting structure adapted to reduce or entirely eliminate the transmission of vibration and which will provide an effective electrical insulation between the device and the supporting structure.

Additional objects are to provide an expansible bolt anchoring device which in use will completely fill the bore or cavity in which it is expanded thereby preventing the entrance of water to such bore; which will securely hold a bolt in a bore having a smooth wall and which will completely fill a cavity having a rough, uneven wall and may be used to securely anchor devices to a relatively brittle or frangible base structure without breaking such structure.

The above objects are accomplished and additional ends are attained by the novel construction, combination and arrangement of parts hereinafter described with reference to the accompanying drawing wherein there is illustrated one form of the invention, it being understood that changes and modifications may be made or resort had to substitutions which come within the scope of the claims hereunto appended.

In the drawing, like characters of reference are employed to designate like parts as the same may appear in any of the several views and in which:—

Figure 1 is a side elevational view of a bolt anchoring device constructed in accordance with this invention, Figure 2 is a central, longitudinal, sectional view of same taken as indicated by the lines 2—2 of Figure 3.

Figure 3 is a front, elevational view of same,

Figure 4 is a cross sectional view taken as indicated by the lines 4—4 of Figure 2, Figure 5 is a similar view showing the anchoring device in an expanded condition mounted in a bore in a concrete structure, only a portion of the structure being shown, Figure 6 is a sectional view of a modified form of the invention showing the manner of positioning the same in a bore preparatory to anchoring a bolt therein, a fragmentary sectional view of the structure being shown and the bolt shown in side elevation.

Figure 7 is a sectional view showing my improved anchoring device in central, longitudinal section as the same is operatively positioned in a bore in a concrete structure, only a part of the structure being shown.

Proceeding now to a detailed description of the invention with reference to the particular adaptation thereof illustrated, the numeral 8 is used to denote a tubular metal core. The core 8 has a relatively short interiorly threaded forward portion 8a and a main body portion 8b which tapers from the portion 8a to a relatively small diameter at the rear end thereof. The tapered body portion 8b is provided with longitudinally directed, circumferentially spaced cuts 9 which extend from the rear end thereof to the forward portion 8a.

The numeral 10 denotes a relatively thick layer of elastic rubber in the form of a sleeve which surrounds the core 8 and which is preferably integrally joined to the core 8 by vulcanization. The rubber body 10 is preferably cylindrical and is formed substantially thicker at the rear end thereof to compensate for the tapered portion 8b of the core 8. In the particular adaptation of the invention illustrated, the core 8 is formed of a metal tube which is interiorly and exteriorly threaded throughout the length thereof, but it is to be understood that the exterior threads may be omitted and that only a portion of the tube may be interiorly threaded if desired.

The rubber body 10 is preferably molded on the core 8 but it may be separately formed and the two parts later assembled if desired.

In use, the improved anchoring member herein disclosed is positioned in a bore 13 which is formed in a structure 14 as shown in Figure 6. A bolt 15 is then entered in the core 8 and operated to force the bolt rearwardly in the bore of said core 8. When the inner end of the bolt 15 reaches the tapered portion 8b of the core 8, the tapered portion of said core will be expanded until it is substantially cylindrical in form when the bolt is fully entered therein. The expansion of the threaded portion 8b of the core 8 forces the rubber body 10 outwardly until it completely fills the bore 13 as shown in Figure 5. As the rubber sleeve 10 is thus subjected to pressure it completely fills the rear portion of the bore 13 and is displaced to completely fill the forward end of the bore thus providing a bolt mounting which is snugly received in the bore and which will not permit the entrance of water thereto.

In the adaptation of the invention shown in Figures 1, 2, 3 and 7, the body 10 is placed in a bore 16 with the flange 11 against the forward face of the structure 17, a bracket 18 or other suitable device is mounted against the forward face of the body 10 and secured in position thereon by means of a bolt 15 which is operatively threaded in the bore of said core.

In this construction, it will be noted that the bracket 18 and the bolt 15 are thus electrically insulated from the structure 17. The rubber body 10 and the flange 11 also provide a cushion which will prevent or materially reduce the transmission of vibration from the bracket 18 to the structure 17.

While I have disclosed a particular form of expansible core 9 any suitable expansible core may be used and while I have illustrated the core 9 as composed of a tube, it may be formed of separate segments.

Having thus illustrated my invention and described the same in detail, what I claim as new and desire to secure by Letters Patent is:—

1. In a bolt anchor, an expansible core, an elastic rubber sleeve closely fitted over said core and an outwardly projecting annular flange on the forward end of said sleeve.

2. In a bolt anchor, a tubular expansible, internally threaded metal shell and a relatively thick rubber sleeve enclosing said shell, and intimately joined thereto.

3. In a bolt anchor, a tubular, expansible, internally threaded metal core and a thick sleeve of relatively soft rubber enclosing said core and integrally joined thereto by vulcanization.

4. A bolt anchor comprising a relatively thick rubber sleeve, an internally threaded, tubular, metal core having a cylindrical forward portion and a tapered main body portion provided with circumferentially spaced, longitudinally directed cuts, said core coaxially arranged in said sleeve and secured thereto by vulcanization.

5. A bolt anchor comprising an internally threaded metal core having a cylindrical forward portion and a main body portion which tapers from said forward portion to a smaller diameter at the rear end thereof, said main body portion provided with circumferentially spaced, longitudinally directed cuts and a relatively thick elastic, cylindrical rubber sleeve closely fitted on said core, and intimately joined thereto by vulcanization.

6. In a device of the character described, a tubular rubber body; an expansible core coaxially arranged therein and vulcanized thereto, said core adapted to be expanded by entering a fastening member therein.

7. In a device of the character described, in combination, an elongated rubber body, an internally threaded, expansible core coaxially arranged therein and vulcanized thereto, a bolt, said core adapted to be expanded by operatively positioning said bolt therein.

LELAND R. ADAMS.